United States Patent Office 2,908,694
Patented Oct. 13, 1959

2,908,694
7-SUBSTITUTED THIO-4-ANDROSTENES

Robert E. Schaub, Paramus, and Martin J. Weiss, Oradell, N.J., assignors to American Cyanamid Company, New York, N.Y., a corporation of Maine No Drawing. Application April 6, 1959
Serial No. 804,106

6 Claims. (Cl. 260—397.4)

This invention relates to new steroids of the androstene series. More particularly, it relates to 7-alkylthio-4-androstenes and 7-alkenylthio-4-androstenes and methods of preparing the same.

The use of steroids for their glucocorticoid activity in the treatment of collagen diseases is well known. Their use, however, as non- or low-virilizing anabolic agents is less well known. We have now found that the steroids described hereinafter possess these properties and are therefore useful as anabolic agents.

The compounds of the present invention may be illustrated by the general formula:

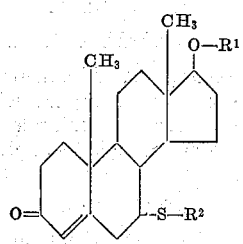

in which $R^1$ is a member of the group consisting of hydrogen, lower alkanoyl, cycloalkyl lower alkanoyl and aroyl radicals and $R^2$ is a member of the group consisting of lower alkyl and lower alkenyl radicals.

The compounds of the present invention are crystalline solids having relatively high melting points. They are relatively insoluble in water and somewhat soluble in the usual organic solvents. They are crystallizable from mixtures of ketones and hydrocarbon solvents.

The present compounds are prepared by reacting a 17β-lower alkanoyl-4,6-androstadiene-3-one with a lower alkyl or lower alkenyl mercaptan. The reaction is preferably carried out in a solvent such as glacial acetic acid in the presence of a mineral acid catalyst. The reaction takes place at a temperature between 0 and 50° C. and is usually complete in a matter of 2 or 3 hours to several days. The product is recovered by evaporation of the solvent used in the reaction followed by taking up the residue in a further organic solvent. Following removal of the latter solvent, the desired product is further purified by crystallization.

The process of this invention proceeds under steric influences and stereoisomers are formed, however, one is obtained in predominate amount. The isomer obtained in predominant amount has in each case been characterized herein as possessing the alpha configuration of the 7 lower alkylthio or lower alkenylthio group. This configuration has been designated in order to provide a more complete exposition of the present invention, and in order that the specification shall constitute a more useful contribution to the art. However, the designated configuration of the 7-lower alkylthio or lower alkenylthio group is based upon an analysis of molecular rotation data presently appearing in the chemical literature, and is therefore not to be interpreted except in relation to the state of the art presently known to organic chemists. It will be apparent that no part of the specification will be materially defective if it should later be established that the configuration is the opposite of that deducible from data presently available to workers in the field.

The compounds of the present invention can be used in the form of tablets, fills, powders, and so forth, which may also contain starch, excipients, and other ingredients necessary in the compounding of such dosage forms. They may be used singly or in combination with other steroids.

In the present application the term lower alkyl radical is intended to cover saturated hydrocarbon radicals having 1 to 6 carbon atoms. The term lower alkanoyl radical is intended to cover the acyl radicals obtained from alkanoic acids having 1 to 14 carbon atoms and the term cycloalkyl lower alkanoyl radical is intended to cover acyl radicals obtained from cycloalkyl substituted alkanoic acids having 7 to 11 carbon atoms with 5 or 6 carbon atoms in the cycloalkyl group.

The following examples illustrate in detail the preparation of the 7-alkylthio- and 7-alkenylthioandrostenes of the present invention.

EXAMPLE 1

Preparation of 17β-acetoxy-7α-methylthio-4-androsten-3-one

A solution of 0.6 g. of 17β-acetoxy-4,6-androstadien-3-one [C. Djerassi et al., J. Am. Chem. Soc., 72, 4538 (1950)], 1 ml. of concentrated hydrochloric acid and 5 ml. of methylmercaptan in 25 ml. of glacial acetic acid is allowed to stand at 5–8° C. for 48 hours. The reaction mixture is evaporated to dryness under reduced pressure and the concentrate is diluted with methylene chloride and washed with excess saturated sodium bicarbonate solution, and then with water. The organic phase is dried with anhydrous magnesium sulfate and evaporated to dryness under reduced pressure to give a glass. Crystallization from acetone-petroleum ether gives 17β-acetoxy - 7α - methylthio-4-androsten-3-one. Recrystallization from acetone-petroleum ether affords white crystals $\lambda_{max}^{MeOH}$ 240 m$\mu$ ($\epsilon$=15,500); $\nu$ 1730, 1675, 1620, 1240 cm.$^{-1}$.

EXAMPLE 2

Preparation of 17β-acetoxy - 7α - ethylthio-4-androsten-3-one

A solution of 0.865 g. of 17β-acetoxy-4,6-androstien-3-one, 2 ml. of concentrated hydrochloric acid and 10 ml. of ethylmercaptan in 75 ml. of glacial acetic acid is allowed to stand at 5–8° C. for 72 hours. The reaction mixture is evaporated to dryness under reduced pressure and the concentrate is diluted with methylene chloride and washed with excess saturated sodium bicarbonate solution, and then with water. The organic phase is dried with anhydrous magnesium sulfate and evaporated to dryness under reduced pressure to give a glass. Crystallization from acetone-petroleum ether gives 17β-acetoxy - 7α - ethylthio-4-androsten-3-one. Recrystallization from acetone-petroleum ether gives white crystals;

$\lambda_{max}^{MeOH}$ 240 m$\mu$ ($\epsilon$=15,800); $\nu$ 1730, 1675, 1620, 1240 cm.$^{-1}$.

EXAMPLE 3

Preparation of 17β-acetoxy-7α-n-propylthio-4-androsten-3-one

A solution of 1.3 g. of 17β-acetoxy-4,6-androstadien-3-one, 2 ml. of concentrated hydrochloric acid and 10 ml. of n-propylmercaptan in 75 ml. of glacial acetic acid is treated according to the procedure described for the preparation of 17β-acetoxy-7α-methylthio-4-androsten-3-one (Example 1) to give 17β-acetoxy-7α-n-propylthio-4-androsten-3-one as white crystals;

$\lambda_{max}^{MeOH}$ 240 mμ

(ε15,100); ν1730, 1675, 1622, 1240 cm.$^{-1}$.

EXAMPLE 4

*Preparation of 17β-acetoxy-7α-allylthio-4-androsten-3-one*

A solution of 1 g. of 17β-acetoxy-4,6-androstadien-3-one, 2 ml. of concentrated hydrochloric acid and 10 ml. of allylmercaptan in 75 ml. of glacial acetic acid is treated according to the procedure described in Example 1 to give 17β-acetoxy-7α-allylthio-4-androsten-3-one;

$\lambda_{max}^{MeOH}$ 241 mμ

(ε15,500); ν1730, 1675, 1619, 1241 cm.$^{-1}$.

EXAMPLE 5

*Preparation of 17β-acetoxy-7α-n-propylthio-4-androsten-3-one*

A solution of 0.6 g. of 17β-acetoxy-4,6-androstadien-3-one, 1 ml. of concentrated hydrochloric acid and 5 ml. of isopropylmercaptan in 25 ml. of glacial acetic acid is treated according to the procedure described in Example 1 to give 17β-acetoxy-7α-isopropylthio-4-androsten-3-one.

$\lambda_{max}^{MeOH}$ 240 mμ

(ε15,300); ν1732, 1675, 1622, 1241 cm.$^{-1}$.

EXAMPLE 6

*Preparation of 7α-methylthiotestosterone*

To a solution of 1 g. of 17β-acetoxy-4,6-androstadien-3-one in 25 ml. of reagent methanol, through which nitrogen is bubbled, is added 6.1 ml. of 1 N methanolic sodium methoxide. The solution is allowed to stand in a stoppered flask, under nitrogen atmosphere, for 4 days. The solution is acidified with glacial acetic acid, concentrated to a small volume under reduced pressure and filtered to give 17β-hydroxy-4,6-androstadien-3-one as white crystals;

$\lambda_{max}^{MeOH}$ 283 mμ

(ε26,000); ν3340, 1650, 1620, 1580 cm.$^{-1}$.

A solution containing 0.585 g. of 17β-hydroxy-4,6-androstadien-3-one, 1 ml. of concentrated hydrochloric acid and 5 ml. of methylmercaptan in 25 ml. of dioxane is treated according to the procedure described in Example 1, to give 7α-methylthiotestosterone;

$\lambda_{max}^{MeOH}$ 240 mμ

(ε=15,200); ν3450, 1670, 1620 cm.$^{-1}$.

EXAMPLE 7

*Preparation of 7α-methylthiotestosterone propionate*

A solution of 1.0 g. of 7α-methylthiotestosterone in 10 ml. of reagent pyridine is treated with 5 ml. of propionic anhydride and allowed to stand overnight at room temperature. The mixture is poured into water, extracted with methylene chloride, the methylene chloride extract washed successively with saturated sodium bicarbonate solution and water, and finally evaporated to dryness under reduced pressure to furnish 7α-methylthiotestosterone propionate as white crystals;

$\lambda_{max}^{MeOH}$ 240 mμ

(ε15,100); ν1732, 1670, 1621, 1220 cm.$^{-1}$.

EXAMPLE 8

*Preparation of 7α-methylthiotestosterone isobutyrate*

A solution of 0.5 g. of 7α-methylthiotestosterone in 5 ml. of reagent pyridine is treated with 3 g. of isobutyric anhydride according to the procedure described in Example 7 to give 7α-methylthiotestosterone isobutyrate;

$\lambda_{max}^{MeOH}$ 239 mμ

(ε14,800); ν1730, 1670, 1625, 1195 cm.$^{-1}$.

EXAMPLE 9

*Preparation of 7α-methylthiotestosterone benzoate*

A solution of 0.6 g. of 7α-methylthiotestosterone in 15 ml. of dry benzene is treated with 2 ml. of dry pyridine and 2 g. of benzoyl chloride and allowed to stand overnight at room temperature. The mixture is poured into water, extracted with methylene chloride, the methylene chloride extracts washed successively with dilute hydrochloric acid, saturated sodium bicarbonate solution and water, and finally evaporated to dryness under reduced pressure to give 7α-methylthiotestosterone benzoate;

$\lambda_{max}^{MeOH}$ 228 mμ

(ε12,000); 240mμ. (ε16,200); ν1710, 1670, 1622, 1270, 1100 cm.$^{-1}$.

EXAMPLE 10

*Preparation of 7α-methylthiotestosterone β-cyclopentylpropionate*

A solution of 1 g. of 7α-methylthiotestosterone in 25 ml. of dry benzene is treated with 3 ml. of dry pyridine and 3 g. of β-cyclopentylpropionyl chloride according to the procedure described in Example 9, to give 7α-methylthiotestosterone β-cyclopentylpropionate;

$\lambda_{max}^{MeOH}$ 240 mμ

(ε15,100); ν1735, 1668, 1620, 1190 cm.$^{-1}$.

EXAMPLE 11

*Preparation of 7α-methylthiotestosterone decanoate*

A solution containing 1 g. of 7α-methylthiotestosterone in 25 ml. of dry benzene is treated with 3 ml. of dry pyridine and 4 g. of decanoyl chloride according to the procedure described in Example 10 to give 7α-methylthiotestosterone decanoate;

$\lambda_{max}^{MeOH}$ 241 mμ

(ε14,800); ν1733, 1670, 1620, 1190 cm.$^{-1}$.

We claim:

1. Compounds having the general formula:

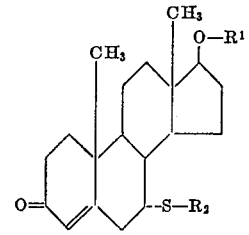

in which R$^1$ is a member of the group consisting of hydrogen, lower alkanoyl, cycloalkyl lower alkanoyl and aroyl radicals and R$_2$ is a member of the group consisting of lower alkyl and lower alkenyl radicals.

2. The compound 17β-acetoxy-7α-methylthio-4-androstene-3-one.

3. The compound 17β-acetoxy-7α-allylthio-4-androstene-3-one.

4. The compound 17β-hydroxy-7α-methylthio-4-androstene-3-one.

5. Compounds having the general formula:

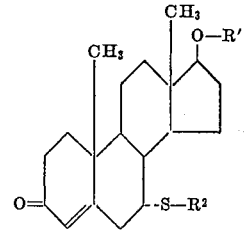

in which R' is a lower alkanoyl radical and R$^2$ is a lower alkyl radical.

6. Compounds having the general formula
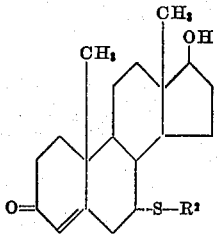
in which $R^2$ is a lower alkyl radical.
References Cited in the file of this patent
UNITED STATES PATENTS
| | | |
|---|---|---|
| 2,837,543 | Dodson et al. | June 3, 1958 |
| 2,859,222 | Dodson et al. | Nov. 4, 1958 |

UNITED STATES PATENT OFFICE
Certificate of Correction

Patent No. 2,908,694                            October 13, 1959

Robert E. Schaub et al.

It is hereby certified that error appears in the printed specification of the above numbered patent requiring correction and that the said Letters Patent should read as corrected below.

Column 3, line 19, Example 5, for the heading "*Preparation of 17β-acetoxy-7α-η-propylthio-4-androsten-3-one*" read —*Preparation of 17β-acetoxy-7α-isopropylthio-4-androsten-3-one*—.

Signed and sealed this 29th day of March 1960.

[SEAL]

Attest:
KARL H. AXLINE,
*Attesting Officer.*

ROBERT C. WATSON,
*Commissioner of Patents.*